US009348032B2

(12) United States Patent
Cho (10) Patent No.: US 9,348,032 B2
(45) Date of Patent: May 24, 2016

(54) DATABASE UPDATE METHOD AND APPARATUS FOR LOCATING A PCELL (75) Inventor: Chae Hwan Cho, Gwacheon Si (KR)

(73) Assignees: SK PLANET CO., LTD., Seoul (KR); SK TELECOM CO., LTD., Seoul (KR)

( * ) Notice: Subject to any disclaimer, the term of this patent is extended or adjusted under 35 U.S.C. 154(b) by 537 days.

(21) Appl. No.: 13/638,796

(22) PCT Filed: Mar. 31, 2011

(86) PCT No.: PCT/KR2011/002223
§ 371 (c)(1),
(2), (4) Date: Oct. 1, 2012

(87) PCT Pub. No.: WO2011/122873
PCT Pub. Date: Oct. 6, 2011

(65) Prior Publication Data
US 2013/0028248 A1 Jan. 31, 2013

(30) Foreign Application Priority Data
Apr. 2, 2010 (KR) .................. 10-2010-0030445

(51) Int. Cl.
H04W 64/00 (2009.01)
G01S 19/42 (2010.01)
G01S 5/02 (2010.01)
G01S 1/72 (2006.01)
H04W 48/20 (2009.01)

(52) U.S. Cl.
CPC .............. *G01S 19/42* (2013.01); *G01S 1/725* (2013.01); *G01S 5/0242* (2013.01); *H04W 64/003* (2013.01); *H04W 48/20* (2013.01)

(58) Field of Classification Search
None
See application file for complete search history.

(56) References Cited

U.S. PATENT DOCUMENTS

| 7,293,088 B2 * | 11/2007 | Douglas et al. ............... 709/224 |
| 2009/0280829 A1 * | 11/2009 | Feuerstein .................. 455/456.1 |
| 2012/0115508 A1 * | 5/2012 | Moeglein et al. ........... 455/456.1 |

FOREIGN PATENT DOCUMENTS

| CN | 101283612 A | 4/2007 |
| KR | 10-2006-0041888 | 5/2006 |

(Continued)

OTHER PUBLICATIONS

International Search Report mailed Dec. 20, 2011 for PCT/KR2011/002223.

(Continued)

Primary Examiner — Ayaz Sheikh
Assistant Examiner — Sori Aga
(74) Attorney, Agent, or Firm — Hauptman Ham, LLP (57) ABSTRACT Embodiments of the present invention relate to a database update method and apparatus for locating a pCell. An embodiment of the present invention provides a database update apparatus for locating a pCell, comprising: a database storing grid cells that are sorted by pCell ID; a DB collection unit collecting log data for a WLAN signal from a mobile communication terminal which performs communication using the WLAN signal; an information extraction unit extracting a WLAN parameter from the log data of the WLAN signal; and a DB update unit updating the grid cells by matching and storing the information based on the extracted WLAN parameter in the corresponding grid cell. According to one embodiment of the present invention, the data-based information for AP locations and its application to the determination of a location can enhance the location performance.

7 Claims, 4 Drawing Sheets

(56) References Cited

FOREIGN PATENT DOCUMENTS

| KR | 10-2009-0040102 | | 4/2009 | | |
| KR | 10-2009-0085937 | | 8/2009 | | |
| WO | WO 2007040351 | * | 4/2007 | ............... | H04Q 7/36 |

OTHER PUBLICATIONS

Chinese Office Action for Chinese application No. 201180016761.0 dated Dec. 16, 2014.

* cited by examiner

FIG. 5 pCell Related Parameters

| MCC | MNC | UC ID | CellMRL CNT | CellMRL UC_ID | CellMRL PSC | CellMRL ECNO | CellMRL RSCP | CellMRL Pathloss |
|---|---|---|---|---|---|---|---|---|
| Nation Code | NETWORK Code | UC ID | pCell DB Search Key Value | Number of Collected PSC | MRL UC_ID | MRL PSC | EC/NO | PATHLOSS |

(a)

| SID | NID | BASE ID | REF PN | REF PN PS | Num_P | RX TOT PWR | RMS ERROR PHASE |
|---|---|---|---|---|---|---|---|
| System ID | Network ID | Base Station ID | Reference PN | REF PN Pilot Strength | Neighbor Collection Count | Total Power of Received Signal | Standard Deviation of PN Phase |

WLAN Parameters

| SSID | BSSID | RSSI | Channel | AP Location Information | AP Location Information | AP Location Information |
|---|---|---|---|---|---|---|
| AP Identification | Mac Address | Received Signal Strength | Frequency Information | Latitude | Longitude | Altitude |

(b)

DATABASE UPDATE METHOD AND APPARATUS FOR LOCATING A PCELL

CROSS REFERENCE TO RELATED APPLICATION

This application claims the priority of Korean Patent Application No. 10-2010-0030445, filed on Apr. 2, 2010 in the KIPO (Korean Intellectual Property Office). Further, this application is the National Phase application of International Application No. PCT/KR2011/002223 filed Mar. 31, 2011, which designates the United States and was published in Korean.

TECHNICAL FIELD

An embodiment of the present invention relates to a method and apparatus for updating database for pCell location determination. More particularly, an embodiment of the present invention relates to a database update method and apparatus for pCell location determination which can provide exact location determination using location information about AP (Access Point) without GPS even in doors by constructing database of location information about APs such as wired/wireless routers, WLAN equipment, Internet phones, or the like.

BACKGROUND ART

With remarkable growth of computer, electronic, and communication technologies, a great variety of wireless communication services using a wireless network have been developed and introduced. Thus, services offered by a mobile communication system using a wireless network are now making progress toward a multimedia communication service capable of transmitting circuit data, packet data, etc. as well as a traditional voice service.

Among various wireless Internet services using mobile communication terminals, LBS (Location Based Service) is recently drawing much attention in view of wide usability and convenience. LBS refers to a kind of communication service that finds the location of a mobile communication terminal such as a mobile phone, a PDA (Personal Digital Assistant), or the like, and provides additional information associated with the found location. Location determination techniques used for LBS are normally classified into a network based type for finding the location in a software manner by using propagation environments (i.e., the cell radius of a base station in a mobile communication network), a handset based type using a GPS (Global Positioning System) receiver embedded in a mobile communication terminal, and a hybrid type of both types.

From among these types, the location determination technique of network base type is being widely used in a GPS shadow zone. This technique, however, has a drawback that location determination performance may be lowered due to repeater environments or the like. Additionally, less dense distribution of base stations themselves may often cause an inaccurate location determination.

DETAILED DESCRIPTION OF THE INVENTION

Technical Problems

In order to solve the above-discussed problem, a main object of an embodiment of the present invention is to provide a database update method and apparatus for pCell location determination which can provide exact location determination using location information about AP (Access Point) without GPS even in doors by constructing database of location information about APs.

Technical Solutions

In order to accomplish the above object, an aspect of the present invention provides a database update apparatus for pCell location determination, the apparatus comprising: a database configured to store grid cells that are divided by pCell ID; a DB collection unit configured to collect log data of WLAN signals from a mobile communication terminal which performs a communication using the WLAN signals; an information extraction unit configured to extract WLAN parameters from the log data of the WLAN signals; and a DB update unit configured to update the grid cells by matching information based on the extracted WLAN parameters with the grid cells.

Additionally, according to another aspect of the present invention, provided is a database update method for pCell location determination, the method comprising steps of: collecting log data of each of WLAN signals from a mobile communication terminal which performs a communication using the WLAN signals; extracting WLAN parameters from the log data of the WLAN signals; and updating the grid cells by matching information based on the extracted WLAN parameters with the grid cells pre-stored in database.

Advantageous Effects

As discussed above, according to an embodiment of the present invention, by constructing database of location information about APs such as wired/wireless routers equipped in home or office, WLAN equipment used in companies, Internet phones, or the like, a mobile communication terminal which detects and communicates with AP may be provided with exact location information without GPS even in doors. Namely, unlike conventional pCell location determination technique using only base station information in mobile communication environments, by creating database of location information about APs of WLAN and using it in location determination, it is possible to enhance location determination performance.

DESCRIPTION OF REFERENCE NUMERALS IN DRAWINGS

110: Mobile Communication Terminal
120: Location Determination Protocol

130: Location Calculation Server
140: pCell Location Determination Server
150: pCell Database
200: Database Update Apparatus
210: DB Collection Unit
220: Information Extraction Unit
230: DB Update Unit
240: Database

MODE FOR CARRYING OUT THE INVENTION

Hereinafter, some embodiments of the present invention will be described in detail with reference to the accompanying drawings. In the following description, the same elements will be designated by the same reference numerals although they are shown in different drawings. Further, a detailed description of known configurations and functions incorporated herein will be omitted when it may make the subject matter of the present invention rather unclear.

Additionally, in describing the elements of the present invention, there may be terms used like first, second, A, B, (a), and (b). These will be used solely for the purpose of differentiating one element from the other and not to imply or suggest the substances, order or sequence thereof. If a certain element is described as 'connected', 'coupled', or 'linked' to another element, they may be not only directly 'connected', 'coupled', or 'linked' but also indirectly 'connected', 'coupled', or 'linked' via the third element.

In this disclosure, a pilot cell (hereinafter, referred to as 'pCell') is used for network based location determination technique, which divides a target area into grids having a given size, defines each grid as a pCell, constructs pCell database using location determination results for each pCell, and uses it to find a current location. This technique may provide location determination results of relatively higher accuracy in comparison with other techniques.

Figure 1:
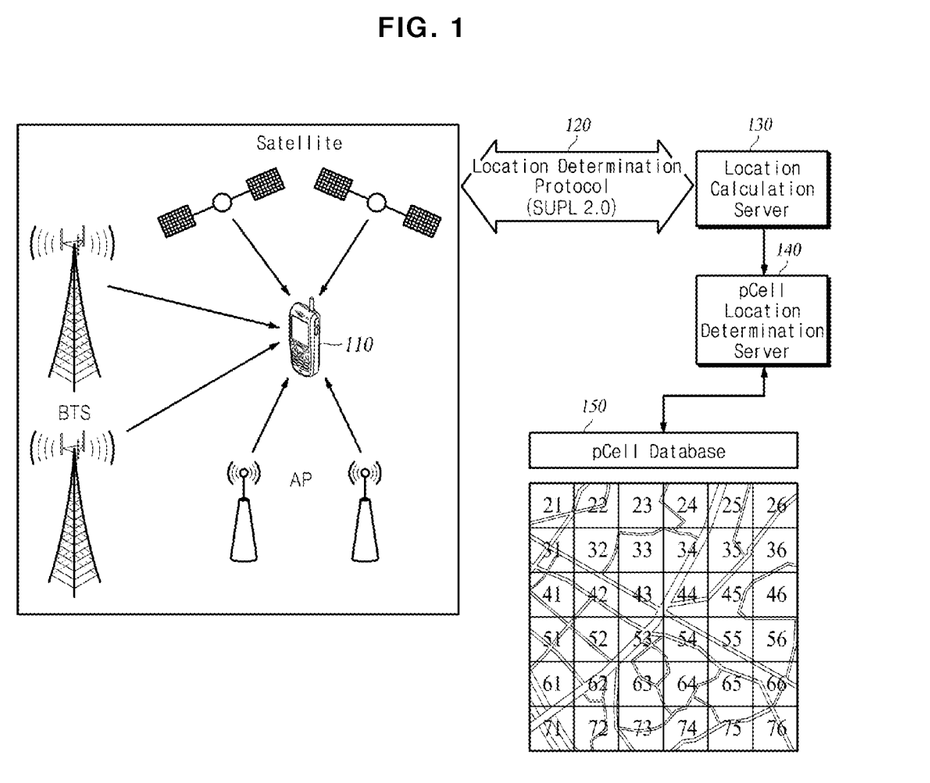
FIG. 1 is a block diagram illustrating a database update system for pCell location determination in accordance with an embodiment of the present invention.

FIG. 1 is a block diagram illustrating a database update system for pCell location determination in accordance with an embodiment of the present invention.

The database update system for pCell location determination according to an embodiment of this invention includes a mobile communication terminal 110, a location determination protocol 120, a location calculation server 130, a pCell location determination server 140, and a pCell database 150. Although in this embodiment the database update system includes the mobile communication terminal 110, the location determination protocol 120, the location calculation server 130, the pCell location determination server 140, and the pCell database 150, this is exemplary only and not to be considered as a limitation of the present invention. As will be understood by those skilled in the art, various changes in elements of the database update system may be made without departing from the essence of the invention.

The mobile communication terminal 110 is a device that has a wireless communication module for performing typical voice communication and data communication. Using this module, the mobile communication terminal 110 interacts with a mobile communication network (not shown) and performs typical voice communication and data communication in a radio communication manner. Meanwhile, the mobile communication terminal 110 sends information on base stations of the mobile communication network to the location calculation server 130.

Additionally, the mobile communication terminal 110 has a GPS (Global Positioning System) module, extracts navigation data from GPS signals received from at least one GPS satellite, and sends the extracted data to the location calculation server 130 through the mobile communication network.

Further, the mobile communication terminal 110 has a WLAN (Wireless Local Area Network) module, accesses the Internet through neighboring AP (Access Point), and receives various webpage data. Here, AP is a device for establishing a data communication, and more specifically, for reading a recipient address from sending information, designating the most suitable communication path, and allowing transmission to other communication network. Namely, AP may extract the destination of data packet, select the best communication path to the extracted destination, and deliver data packet to next device along the selected path. AP may share several lines in normal network environments. In this embodiment, AP may be used as a concept including a router, a repeater, a bridge, and any other equivalents.

The mobile communication terminal 110 may be one of a smart phone, a PC (Personal Computer), a notebook, a PDA (Personal Digital Assistant), and the like, which has the wireless communication module, the GPS module, and the WLAN module therein. Also, the mobile communication terminal 110 has a memory for storing applications associated with LBS (Location Based Service), a microprocessor for operation and control by executing programs, and the like.

The location determination protocol 120 refers to a specific protocol about standards of an application layer for location determination. In an embodiment of the invention, the location determination protocol 120 uses preferably, but not limited to, SUPL (Secure User Plane Location) 2.0 which allows direct transmission/reception of data related to location determination between the location calculation server 130 and the mobile communication terminal 110 via a data transmission path. Therefore, SUPL may remove communications between network nodes required in conventional processes of location determination, reduce costs for constructing nodes required for tracking a location, and provide a more exact location determination service. Although it is desirable that the mobile communication terminal 110 and the location calculation server 130 transmit and receive GPS signals and WLAN signals together using SUPL 2.0, any other location determination protocol that allows simultaneous transmission/reception of GPS signals and WLAN signals may be alternatively used such as IS-801 (Interim Standard-801), RRLP (Radio Resource Location Services Protocol), RRC (Radio Resource Control), or the like.

The location calculation server 130 receives satellite data through a self-constructed satellite receiver, and performs location determination using satellite data of the mobile communication terminal 110 that requires location determination. Namely, the location calculation server 130 receives navigation data from the mobile communication terminal 110, and performs a function to calculate latitude and longitude coordinates of the mobile communication terminal 110. Additionally, the location calculation server 130 transmits aiding data for aiding location determination of the mobile communication terminal 110, and performs a function to calculate a distance between the GPS satellite and the mobile communication terminal 110. Also, if location information is selectively received from the mobile communication terminal 110, the location calculation server 130 performs a function to transmit the received information to LBSP (Location Based Service Platform). The location calculation server 130 delivers, to the pCell location determination server, latitude/longitude data which is result data of location determination, and PPM (Pilot Phase Measurement) data received from the mobile communication terminal 110.

In an embodiment of the invention, the location calculation server 130 receives a location request signal from LBSP, and transmits to HLR (Home Location Register) an SMREQ signal that contains a request for information about a target device for location determination. Then the location calculation server 130 receives from HLR an smreq signal that contains a response to the request for information about a target device for location determination. And then the location calculation server 130 determines a current location of the mobile communication terminal 110 by interacting with the mobile communication terminal 110 and the pCell location determination server 140, and transmits to LBSP a location result signal that contains results of location determination.

Meanwhile, as the location calculation server 130, PDE (Position Determination Entity) may be used in the synchronous CDMA (Code Division Multiple Access) system, PS (Position Server) may be used in the asynchronous W-CDMA (Wideband CDMA) system, and SMLC (Serving Mobile Location Center) may be used in the GSM (Global System for Mobile communication) system. This is exemplary only and not to be considered as a limitation of this invention. In CDMA, PDE may perform location determination using satellites and network-based location determination using triangulation. In W-CDMA, PS may perform location determination using satellites and basic cell-based location determination. In GSM, SMLC may perform location determination using satellites and cell-based location determination.

The above-mentioned PPM data includes time/distance information of neighboring base stations and system information measured by the mobile communication terminal 110. Specifically, basic data collected by the mobile communication terminal 110 are information about current serving system, a pilot signal of neighboring base station, signal strength (Ec/Io), and the like. Information about current serving system includes system ID (hereinafter, referred to as 'SID' network ID (hereinafter, referred to as 'NID'), base station ID (hereinafter, referred to as 'BSID'), reference PN (hereinafter, referred to as 'Ref_PN') which is a current serving base station sector number, pilot phase in Ref_PN, signal strength, and the like. Also, a pilot signal of neighboring base station includes distance data and time data, such as a neighboring base station sector number (i.e., measurement PN) collected from the mobile communication terminal 110, pilot phase in each measurement PN, signal strength, and the like. The above PPM data which is data related to location determination in the CDMA system may be SFN-SFN (System Frame Number) observed time difference data or UE RX-TX time difference data in the W-CDMA system, or any other data related to location determination in any other communication systems.

Although the location calculation server 130 is described above as being applied to CDMA and WCDMA to provide pCell location determination, this is exemplary only and not to be considered as a limitation of the invention. Alternatively, as will be understood by those skilled in the art, the location calculation server 130 may be applied to WiBro, LTE (Long Term Evolution) and EPC (Evolved Packet Core) to provide pCell location determination.

The pCell location determination server 140 is a server that determines a current location of the mobile communication terminal 110 corresponding to a target of location determination by using the pCell database 150. When there is a request for location determination from the mobile communication terminal 110 to the location calculation server 130, the pCell location determination server 140 selects a specific pCell, having the best pattern compatibility with PPM data received from the mobile communication terminal 110, in the pCell database 150 and then offers it as a final result of location determination to a service requester. In order to provide an exact result of location determination to the service requester, the pCell database 150 should always maintain the newest data (e.g., PN, pilot phase, signal strength, etc.) that may fully reflect variations in location determination environments such as status of location determination system, wireless environments, or the like at time of location determination request.

Although the pCell location determination server 140 is described as being applied to CDMA and WCDMA to provide pCell location determination, this is exemplary only and not to be considered as a limitation of the invention. Alternatively, as will be understood by those skilled in the art, the pCell location determination server 140 may be applied to WiBro, LTE (Long Term Evolution) and EPC (Evolved Packet Core) to provide pCell location determination.

Database update may be performed through a database update apparatus 200 that is disposed inside or outside the pCell location determination server 140 of an embodiment of the invention. In FIG. 1 the database update apparatus 200 is contained in the pCell location determination server 140, whereas in FIG. 2 the database update apparatus 200 is separately realized at the outside of the pCell location determination server 140.

In an embodiment of the invention, the pCell location determination server 140 collects log data of each of GPS signals and WLAN signals from the mobile communication terminal 110 via the location calculation server 130. Then the pCell location determination server 140 extracts WLAN parameters from the collected log data of WLAN signals. By matching information based on the extracted WLAN parameters with grid cells stored in the pCell database 150, the pCell location determination server 140 updates the grid cells. Here, the WLAN signals include at least one of Wi-Fi signals, WiMax signals, DTIM (Delivery Traffic Indication Message), and hot spot signals. DTIM is a kind of TIM which informs the wireless client about the presence of data on AP. The WLAN parameters include identification information, MAC address information, received signal strength information, frequency information, latitude information, longitude information, and altitude information about AP which sends and receives WLAN signals to and from the mobile communication terminal 110. The grid cells are cells into which a particular area is divided with a given size, and include pCell ID based on PSC (Primary Scrambling Code) and a base station sector number (Ref_PN) for a base station located in the area. Namely, the grid cells may be set to M×N size. For example, the grid cells may be set as a square form such as 100×100, 50×50, 30×30, 25×25, 20×20, 10×10, 5×5 and 1×1. However, the grid cells are not limited to the above examples and may be set in various forms suitable for respective environments through optimum process.

In case of success in location determination for GPS signals received from the mobile communication terminal 110, the pCell location determination server 140 performs a function to collect, for a certain period, log data of WLAN signals received just at the same time as GPS signals received at time of success in location determination. Namely, when location determination succeeds for GPS signals, the pCell location determination server 140 picks out, as reliable data, only data in case where the number of satellites detected for location determination equals to or greater than a specific number, and then collects log data of WLAN signals received just at the same time as the reliable data are received.

Additionally, the pCell location determination server 140 performs a function to match WLAN parameters with respective grid cells as identifiers for identifying the grid cells. When updating the grid cells by using WLAN parameters, the pCell location determination server 140 performs a function to use at least one of latitude information, longitude information and altitude information about AP which sends and receives WLAN signals to and from the mobile communication terminal 110. If the mobile communication terminal 110 supports SUPL, the pCell location determination server 140 performs a communication with the mobile communication terminal 110 by using SUPL in order to collect at least one of GPS signals and WLAN signals. If the mobile communication terminal 110 performs a short-range communication including at least one of Zigbee, UWB, Bluetooth and RFID, the pCell location determination server 140 performs a function to collect log data for short-range communication signals from the mobile communication terminal 110. Further, the pCell location determination server 140 performs a function to collect log data for each of GPS signal and WLAN signal for a certain period or according to certain counts.

Although in this invention the pCell location determination server 140 or the database update apparatus 200 is described as updating the pCell database 150 or a database 240, the following schemes may be also used in an actual realization of the invention. In the first scheme, a service operator may construct database of AP information matched with GPS signals by using a special apparatus equipped with GPS and AP receivers. In the second scheme, such database may be constructed through a manual input of AP information from an operator or a subscriber. Namely, in the second scheme, it is possible to manually input newly found AP information at any operating terminal or to manually input already known AP information through any mobile device or website by a subscriber (user).

The pCell database 150 is specific database used for pCell location determination. The pCell database 150 stores result data of every location determination as basic data in grid cells classified by pCell ID, and also stores standard data as a representative of basic data. Here, standard data is data used for comparison in view of pattern compatibility during pCell location determination. Standard data greatly influence the accuracy of location determination and are updated in update of database.

A normal update method of pCell database is to update standard data by merely calculating an arithmetic mean of new location determination result data and previously stored basic data. In this method, new location determination result data are insignificantly reflected to the updated standard data. Particularly, if there are a lot of basic data previously stored in database, new location determination result data can hardly affect the update of standard data in spite of database update.

In order for a pCell location determination method to provide a more exact result of location determination, database should be updated to always maintain the newest data (e.g., PN, pilot phase, signal strength, etc.). However, due to the above-discussed features of normal database update in a pCell location determination, a conventional method of database update may fail to fully reflect variations in location determination environments such as status of location determination system, wireless environments, or the like. For example, if location determination system or wireless environments are frequently changed, current result data of location determination may provide more exact results of location determination than standard data already stored in database. In this case, it is required that standard data stored in database adaptively meet variations in current environments of location determination by reflecting current result data of location determination on much higher level in the update of standard data stored in database.

Meanwhile, the pCell database 150 means a general data structure that is implemented in a storage space (e.g., a hard disc or memory) of a computer system by using a database management program (i.e., DBMS). Also, the pCell database 150 refers to a data storage form where data search (extraction), deletion, edition, addition, etc. are free. And also, the pCell database 150 may be embodied using a relational database management system (RDBMS) such as Oracle, Infomix, Sybase, and DB2, an object oriented database management system (OODBMS) such as Gemston, Orion, and O2, or XML Native Database such as Excelon, Tamino, and Sekaiju, depending on the purpose of an embodiment of the invention, and having appropriate fields or elements for performing its own functions.

Figure 2:
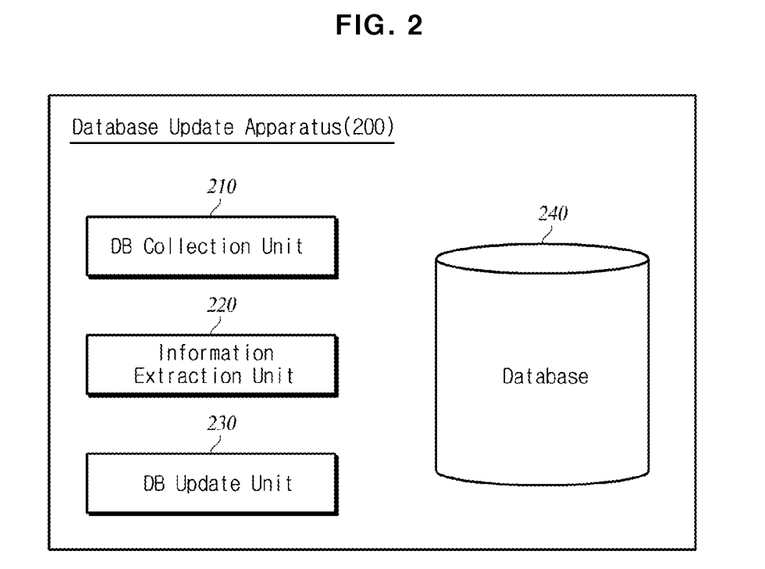
FIG. 2 is a block diagram illustrating a database update apparatus in accordance with an embodiment of the present invention.

FIG. 2 is a block diagram illustrating a database update apparatus in accordance with an embodiment of the present invention.

The database update apparatus 200 shown in FIG. 2 is constructed separately from the pCell location determination server 140. This is, however, exemplary only and not to be considered as a limitation of the invention. Alternatively, the database update apparatus 200 may be formed in the pCell database 150. Additionally, the database 240 shown in FIG. 2 is preferably, but not limited to, the same database as the pCell database 150 shown in FIG. 1. Alternatively, the database 240 may be formed as separate database or may store the same information as pCell related information stored in the pCell database 150.

In an embodiment of the invention, the database update apparatus 200 includes a DB collection unit 210, an information extraction unit 220, a DB update unit 230, and the database 240. Although in this embodiment the database update apparatus 200 includes the DB collection unit 210, the information extraction unit 220, the DB update unit 230, and the database 240, this is exemplary only and not to be considered as a limitation of the present invention. As will be understood by those skilled in the art, various changes in elements of the database update apparatus 200 may be made without departing from the essence of the invention.

The DB collection unit 210 performs a function to collect log data for each of GPS signals and WLAN signals from the mobile communication terminal 110 that performs a communication by using at least one of GPS signals and WLAN signals. In case of success in location determination for GPS signals, the DB collection unit 210 performs a function to collect, for a certain period, log data of WLAN signals received just at the same time as GPS signals received at time of success in location determination. Namely, when location determination succeeds for GPS signals, the DB collection unit 210 picks out, as reliable data, only data in case where the number of satellites detected for location determination equals to or greater than a specific number, and then collects log data of WLAN signals received just at the same time as the reliable data are received.

If the mobile communication terminal 110 supports SUPL, the DB collection unit 210 performs a communication with the mobile communication terminal 110 by using SUPL in order to collect at least one of GPS signals and WLAN signals. If the mobile communication terminal 110 performs a short-range communication including at least one of Zigbee, UWB, Bluetooth and RFID, the DB collection unit 210 performs a function to collect log data for short-range communication signals from the mobile communication terminal 110. Further, the DB collection unit 210 performs a function to collect log data for each of GPS signal and WLAN signal for a certain period or according to certain counts.

The information extraction unit 220 performs a function to extract WLAN parameters from log data of WLAN signals. The DB update unit 230 performs a function to update grid cells by matching information based on the extracted WLAN parameters with the grid cells. Also, the DB update unit 230 performs a function to match the WLAN parameters, as identifiers for identifying the pre-stored grid cells, with the respective grid cells. When updating the grid cells by using the WLAN parameters, the DB update unit 230 uses at least one of latitude information, longitude information and altitude information about AP which sends and receives WLAN signals to and from the mobile communication terminal 110.

The database 240 stores grid cells classified by pCell ID. A detailed description about the database 240 will be given later with reference to FIG. 3. Meanwhile, the WLAN signals include at least one of Wi-Fi signals, WiMax signals, DTIM, and hot spot signals. The WLAN parameters include identification information, MAC address information, received signal strength information, frequency information, latitude information, longitude information, and altitude information about AP which sends and receives WLAN signals to and from the mobile communication terminal 110. The grid cells are cells into which a particular area is divided with a given size, and include pCell ID based on PSC and a base station sector number (Ref_PN) for a base station located in the area.

Figure 3:
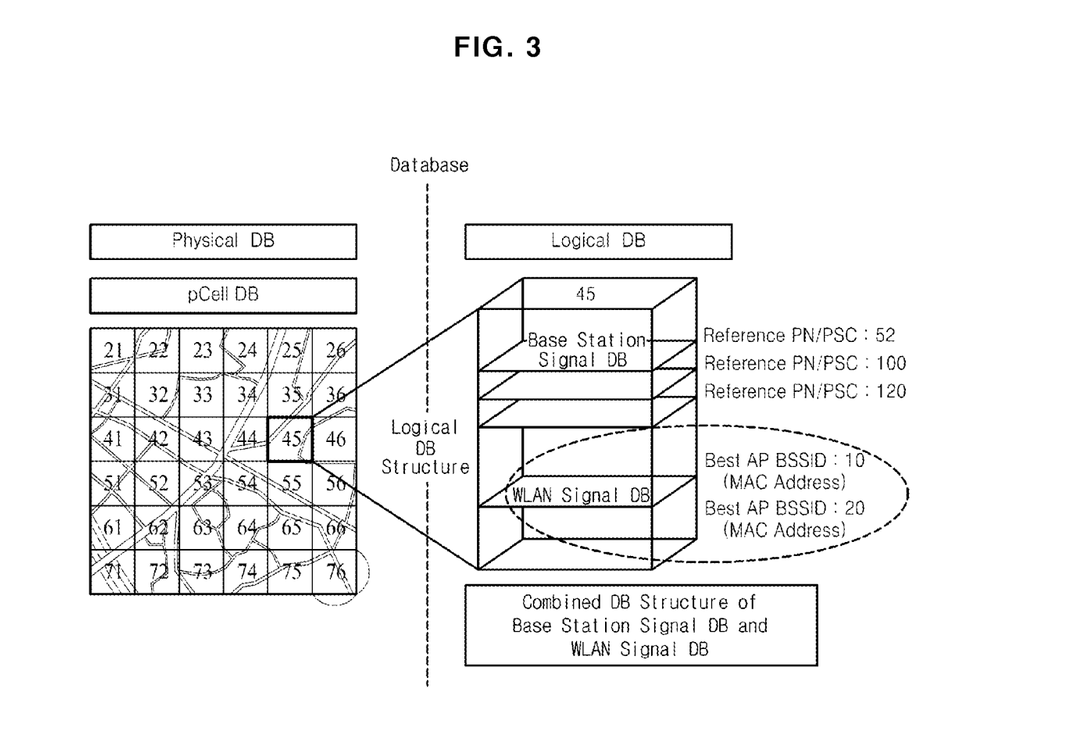
FIG. 3 is an example view illustrating physical and logical concepts of database in accordance with an embodiment of the present invention.

FIG. 3 is an example view illustrating physical and logical concepts of database in accordance with an embodiment of the present invention.

Referring to physical database of the database 240 of the database update apparatus 200 and the pCell database 150 shown in FIG. 3, a target area of location measurement service is divided into grids having a given size, each grid is defined as pCell, and pCell database is constructed using results of location determination for each pCell. The grid cells shown in FIG. 3 are cells into which a specific area is divided with a predetermined size, and have pCell ID based on PSC and a base station sector number for a base station located in the area. Namely, the grid cells may be set to M×N size. For example, the grid cells may be set as a square form such as 100×100, 50×50, 30×30, 25×25, 20×20, 10×10, 5×5 and 1×1. However, the grid cells are not limited to the above examples and may be established in various forms suitable for respective environments through optimum process.

Meanwhile, referring to logical database of the database 240 of the database update apparatus 200 and the pCell database 150 shown in FIG. 3, database basically includes information about current serving system, a pilot signal of neighboring base station, signal strength (Ec/Io), and the like. Information about current serving system includes system ID (SID), network ID (NID), base station ID (BSID), reference PN (Ref_PN) which is a current serving base station sector number, pilot phase in Ref_PN, signal strength, and the like. Additionally, identification information, MAC address information, received signal strength information, frequency information, latitude information, longitude information, and altitude information about AP sending and receiving WLAN signals to and from the mobile communication terminal 110 are matched and stored.

The pCell database 150 and the database 240 of the database update apparatus 200 mean a general data structure that is implemented in a storage space (e.g., a hard disc or memory) of a computer system by using a database management program (i.e., DBMS). Also, such database refers to a data storage form where data search (extraction), deletion, edition, addition, etc. are free, and may be embodied using a relational database management system such as Oracle, Infomix, Sybase, and DB2, an object oriented database management system such as Gemston, Orion, and O2, or XML Native Database such as Excelon, Tamino, and Sekaiju, depending on the purpose of an embodiment of the invention, and having appropriate fields or elements for performing its own functions.

Figure 4:
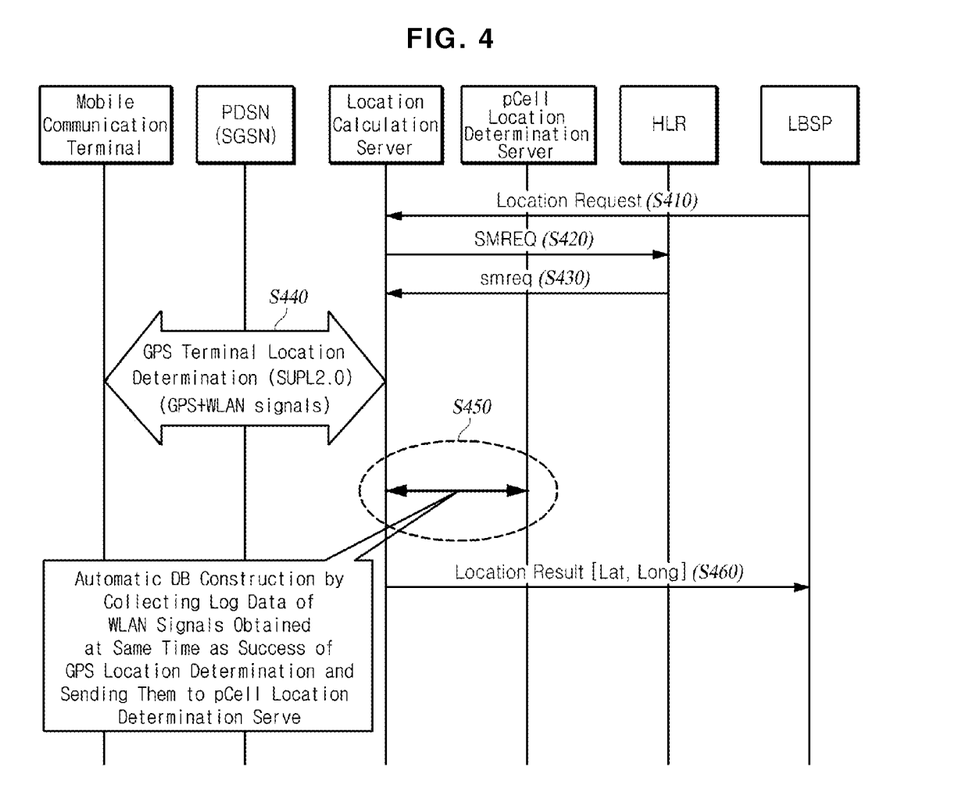
FIG. 4 is a flow diagram illustrating a database update method for pCell location determination and a method for providing location determination results by using updated database in accordance with an embodiment of the present invention.

FIG. 4 is a flow diagram illustrating a database update method for pCell location determination and a method for providing location determination results by using updated database in accordance with an embodiment of the present invention.

FIG. 4 will be described on the assumption that the database update apparatus 200 is included in the pCell location determination server 140. The location calculation server 130 receives a location request from LBSP (step S410). Here, LBSP is a kind of service server that provides a plurality of additional services on the basis of location information offered from the mobile communication terminal 110. LBSP receives a request for joining a location based service from a mobile communication subscriber using the mobile communication terminal 110, checks the location of the mobile communication terminal 110 by interacting with the mobile communication terminal 110 and HLR, and provide various additional services on the basis of the location.

The location calculation server 130 transmits to HLR an SMREQ signal that contains a request for information about a target device for location determination (step S420). Then the location calculation server 130 receives from HLR an smreq signal that contains a response to the request for information about a target device for location determination (step S430).

The location calculation server 130 receiving the smreq signal from HLR checks device information and then, based on device status, receives at least one of GPS signal and WLAN signal from the mobile communication terminal 110 (step S440). Then the location calculation server 130 transmits at least one of received GPS signal and WLAN signal to the pCell location determination server 140. Here, if GPS signals received to the mobile communication terminal 110 are good, the location calculation server 130 may calculate results of location determination using GPS signals. However, if no GPS signal is received due to entry into a shadow zone, the location calculation server 130 may receive WLAN signals from the mobile communication terminal 110 and then transmit them to the pCell location determination server 140.

The pCell location determination server 140 determines a current location of the mobile communication terminal 110, based on at least one of GPS signal and WLAN signal via the location calculation server 130, and then transmits results of location determination to the location calculation server 130 (step S450). Then the location calculation server 130 transmits location result signals, including results of location determination received from the pCell location determination server 140, to LBSP (step S460).

If GPS signals received to the mobile communication terminal 110 are good, the pCell location determination server 140 may update the pCell database 150 by using GPS signals and WLAN signals received from the mobile communication terminal 110 in step S450. Specifically, the pCell location determination server 140 collects log data for each of GPS signal and WLAN signal from the mobile communication terminal 110 via the location calculation server 130, extracts WLAN parameters from the collected log data of WLAN signals, and updates grid cells by matching information based on the extracted WLAN parameters with the grid cells stored in the pCell database 150. Here, the WLAN signals include at least one of Wi-Fi signals, WiMax signals, DTIM, and hot spot signals. The WLAN parameters include identification information, MAC address information, received signal strength information, frequency information, latitude information, longitude information, and altitude information about AP which sends and receives WLAN signals to and from the mobile communication terminal 110. The grid cells are cells into which a particular area is divided with a given size, and include pCell ID based on PSC and a base station sector number for a base station located in the area.

In case of success in location determination for GPS signals received from the mobile communication terminal 110, the pCell location determination server 140 performs a function to collect, for a certain period, log data of WLAN signals received just at the same time as GPS signals received at time of success in location determination. Namely, when location determination succeeds for GPS signals, the pCell location determination server 140 picks out, as reliable data, only data in case where the number of satellites detected for location determination equals to or greater than a specific number, and then collects log data of WLAN signals received just at the same time as the reliable data are received.

Additionally, the pCell location determination server 140 performs a function to match WLAN parameters with respective grid cells as identifiers for identifying the grid cells. When updating the grid cells by using WLAN parameters, the pCell location determination server 140 performs a function to use at least one of latitude information, longitude information and altitude information about AP which sends and receives WLAN signals to and from the mobile communication terminal 110. If the mobile communication terminal 110 supports SUPL, the pCell location determination server 140 performs a communication with the mobile communication terminal 110 by using SUPL in order to collect at least one of GPS signals and WLAN signals. If the mobile communication terminal 110 performs a short-range communication including at least one of Zigbee, UWB, Bluetooth and RFID, the pCell location determination server 140 performs a function to collect log data for short-range communication signals from the mobile communication terminal 110. Further, the pCell location determination server 140 performs a function to collect log data for each of GPS signal and WLAN signal for a certain period or according to certain counts.

Although FIG. 4 shows sequential execution of steps from S410 to S460, this is exemplary only and not to be considered as a limitation of the present invention. As will be understood by those skilled in the art, it is possible to change the order of steps shown in FIG. 4 or to execute in parallel more than one of steps S410 to S460 without departing from the essence of the invention.

As described above, the database update method for pCell location determination shown in FIG. 4 may be implemented on a computer program and provided in a computer readable recording medium. The computer readable recording medium which encodes the computer program that implements the respective steps of the database update method for pCell location determination may include any kinds of recording devices for recording data readable by computers. Examples of such computer readable recording medium include ROM, RAM, CD-ROM, magnetic tapes, floppy discs, and optical data storages, and further include an implementation in carrier waves (e.g. transmission over the Internet). In addition, the computer readable recording medium may be provided in a distributed processing system where computer systems are networked to store and execute the computer readable codes at distributed locations. Furthermore, functional programs, codes, and code segments to implement an embodiment of this invention may be easily deduced by programmers skilled in the art thereof.

Figure 5:
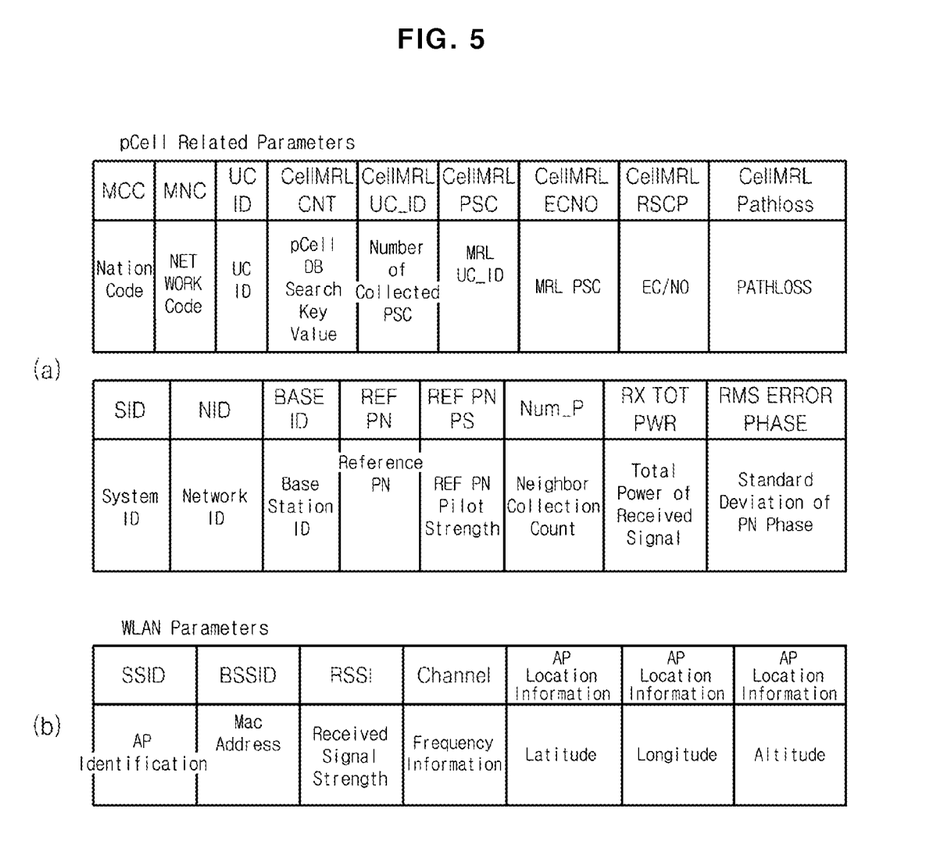
FIG. 5 is an example view illustrating pCell related parameters and WLAN parameters in accordance with an embodiment of the present invention.

FIG. 5 is an example view illustrating pCell related parameters and WLAN parameters in accordance with an embodiment of the present invention.

FIG. 5 exemplarily shows data parameters stored in the pCell database 150 or in database of the database update apparatus 200. As shown in (a) of FIG. 5, pCell related parameters stored in the pCell database 150 or in the database 240 of the database update apparatus 200 include nation code (MCC), network code (MNC), UCID, pCell DB search key value (PSC), the number of collected PSC (CellMRL CNT), CellMRL PSC, CellMRL ECNO, CellMRL RSCP, CellMRL Pathloss, SID (system ID), NID (network ID), BASE ID (base station ID), REF PN (base station sector number), REF PN PS (REF PN pilot strength), Num_P (neighbor collection count), RX TOT PWR (total power of received signal), and RMS ERROR PHASE (standard deviation of PN phase).

Additionally, as shown in (b) of FIG. 5, WLAN parameters stored in the pCell database 150 or in the database 240 of the database update apparatus 200 include identification information (SSID) about AP which sends and receives WLAN signals to and from the mobile communication terminal 110, MAC address information (BSSID), received signal strength information (RSSI), frequency information (Channel), AP latitude information, AP longitude information, and AP altitude information.

Although all elements of an embodiment of the invention may have been explained as assembled or operatively connected as a unit, this is exemplary only and not to be considered as a limitation of the invention. Alternatively, within the scope of the present invention, the respective elements may be selectively and operatively combined in any numbers. Every one of the elements may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless this disclosure expressly defines them so.

Although exemplary aspects of the present invention have been described for illustrative purposes, those skilled in the art will appreciate that various modifications, additions and substitutions are possible, without departing from essential characteristics of the invention. Thus, embodiments disclosed herein are exemplary only and not to be considered as a limitation of the invention. Accordingly, the scope of the invention is not to be limited by the above aspects but by the claims and the equivalents thereof.

INDUSTRIAL APPLICABILITY

As fully discussed above, the present invention are highly useful for application in various fields and enhance location determination performance by constructing database of location information about APs and then allowing a mobile communication terminal detecting and communicating with AP to be provided with exact location information without GPS even in doors.

What is claimed is:

1. A database update apparatus for pCell location determination, the apparatus comprising:
   a database configured to store a plurality of pCell parameters extracted from signal of base stations associated with grid cells of mobile communication network that are classified by pCell ID;
   a DB collection unit configured to collect log data of WLAN signals from a mobile communication terminal having a WLAN module, wherein the WLAN module performs a communication with an AP (Access Point) using the WLAN signals;
   an information extraction unit configured to extract WLAN parameters from the log data; and
   a DB update unit configured to update the database by storing the extracted WLAN parameters with pCell ID as the pCell parameters on a corresponding grid cell in the database,
   wherein the pCell ID is identified based on PSC (Primary Scrambling Code) and a base station sector number (Ref_PN) for a base station located in an area, and
   wherein the pCell parameters includes at least one of system ID, network ID, base station ID, the base station sector number (Ref_PN), pilot phase and signal strength of in the base station sector number (Ref_PN), a neighboring base station sector number (measurement PN), and pilot phase in the measurement PN.

2. The apparatus of claim 1, wherein the DB collection unit is further configured to collect log data of the WLAN signals and GPS signals at a time when a positioning of the mobile communication terminal is determined by a GPS module in the mobile communication terminal.

3. The apparatus of claim 2, wherein the DB collection unit is further configured to collect the log data of the WLAN signals and GPS signals at a time when the positioning of the mobile communication terminal is determined by at least a predetermined number of satellites.

4. The apparatus of claim 2, wherein the DB collection unit is further configured to collect the log data from the mobile communication terminal through SUPL (Secure User Plane Location) protocol.

5. The apparatus of claim 2,
   wherein the mobile communication terminal further comprises at least one short-range communication module for performing Zigbee, UWB, Bluetooth or RFID communication, and
   wherein the DB collection unit is further configured to collect the log data including a corresponding short-range communication signal.

6. The apparatus of claim 2, wherein the WLAN parameters include identification information, MAC address information, received signal strength information, frequency information, latitude information, longitude information, and altitude information about AP which sends and receives the WLAN signals to and from the mobile communication terminal.

7. An update method of a database for pCell location determination, the database storing a plurality of pCell parameters extracted from signal base stations associated with grid cells of mobile communication network that are classified by pCell ID, the method comprising:
   collecting, by a database update apparatus, log data of WLAN signals from a mobile communication terminal having a WLAN module, wherein the WLAN module performs a communication with an AP (Access Point) using the WLAN signals;
   extracting, by the database update apparatus, WLAN parameters from the log data; and
   updating, by the database update apparatus, the database by storing the extracted WLAN parameters with pCell ID as the pCell parameters on a corresponding grid cell in the database,
   wherein the pCell ID is identified based on PSC (Primary Scrambling Code) and a base station sector number (Ref_PN) for a base station located in an area, and
   wherein the pCell parameters includes at least one of system ID, network ID, base station ID, the base station sector number (Ref_PN), pilot phase and signal strength of in the base station sector number Ref_PN, a neighboring base station sector number (measurement PN), and pilot phase in the measurement PN.

* * * * *